US008774209B2

(12) United States Patent  (10) Patent No.: US 8,774,209 B2
Sadek et al.  (45) Date of Patent: Jul. 8, 2014

(54) APPARATUS AND METHOD FOR SPECTRUM SHARING USING LISTEN-BEFORE-TALK WITH QUIET PERIODS

(75) Inventors: Ahmed K. Sadek, San Diego, CA (US); Stephen J. Shellhammer, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 482 days.

(21) Appl. No.: 12/852,128

(22) Filed: Aug. 6, 2010

(65) Prior Publication Data

US 2011/0128895 A1  Jun. 2, 2011

Related U.S. Application Data

(60) Provisional application No. 61/266,146, filed on Dec. 2, 2009.

(51) Int. Cl.
*H04L 12/413* (2006.01)
*H04W 74/00* (2009.01)

(52) U.S. Cl.
USPC .......................................... 370/445; 370/447

(58) Field of Classification Search
None
See application file for complete search history.

(56) References Cited

U.S. PATENT DOCUMENTS 6,697,626 B1   2/2004  Eidson et al.
7,990,944 B2*  8/2011  Stanwood et al. ............ 370/350
8,169,902 B2*  5/2012  Fukui ........................ 370/230.1
2009/0067448 A1*  3/2009  Stanwood et al. ............ 370/447
2011/0249627 A1*  10/2011  Stanwood et al. ............ 370/328

FOREIGN PATENT DOCUMENTS

JP   2009188927 A   8/2009

OTHER PUBLICATIONS

International Search Report and Written Opinion—PCT/US2010/058250, International Search Authority—European Patent Office—Mar. 30, 2011.
Steer D. G., "Coexistence and Access Etiquette in the United States Unlicensed PCS Band OA Listen-Before-Transmit Protocol Controls the Flow of Traffic", IEEE Personal Communications, IEEE Communications Society, US, vol. 1, No. 4, Oct. 1, 1994, pp. 36-43, XP000478096, ISSN: 1070-9916, DOI:10.1109/MPC.1994.337510.

* cited by examiner

*Primary Examiner* — Robert C Scheibel
(74) *Attorney, Agent, or Firm* — Stanton Braden

(57) ABSTRACT

Apparatus and method for spectrum sharing using listen before talk (LBT) and quiet periods are disclosed. This includes assessing using LBT to determine if a shared spectrum channel is being used by at least one other network, and transmitting transmission frames over the shared spectrum channel in at least one of an uplink or a downlink when the channel is determined as not being used. The accumulated time of transmission use of the spectrum channel is counted based on predetermined conditions, and a determination made when the accumulated time exceeds a maximum allotted time. Transmission of frames by a network is allowed to continue if the maximum time has not been exceeded and the spectrum remains available. A quiet period is then executed once the maximum time period is exceeded.

40 Claims, 8 Drawing Sheets

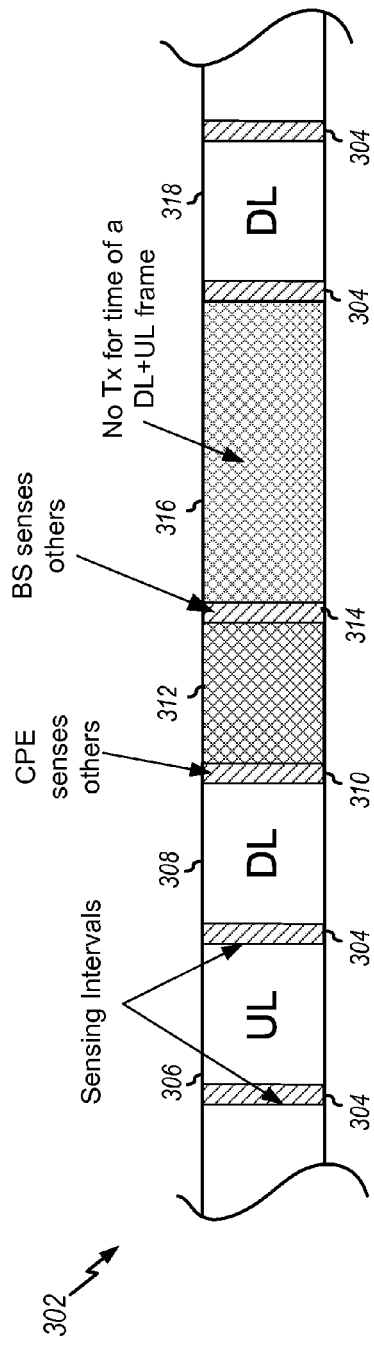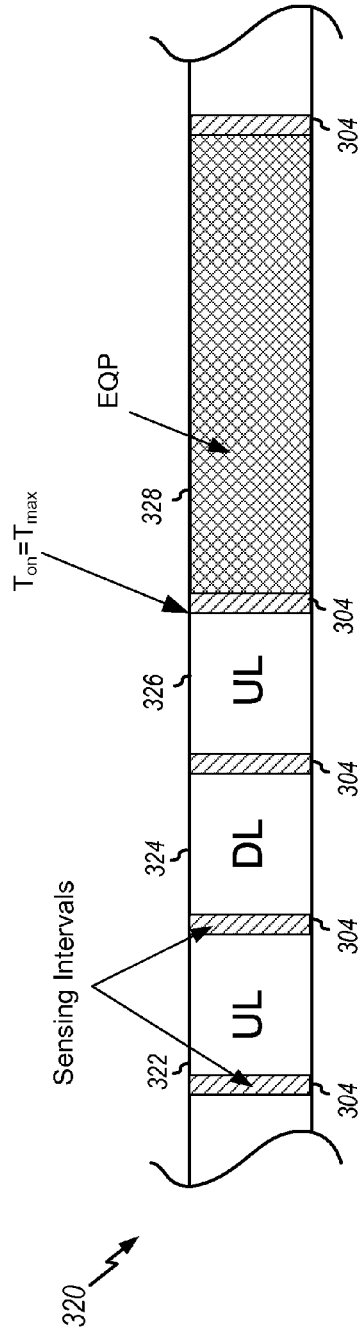
Fig. 3A
Fig. 3B

APPARATUS AND METHOD FOR SPECTRUM SHARING USING LISTEN-BEFORE-TALK WITH QUIET PERIODS

CLAIM OF PRIORITY UNDER 35 U.S.C. §119

The present Application for Patent claims priority to Provisional Application No. 61/266,146 filed Dec. 2, 2009 entitled "APPARATUS AND METHOD FOR SPECTRUM SHARING USING LISTEN-BEFORE TALK (LBT) WITH QUIET PERIODS", and assigned to the assignee hereof and hereby expressly incorporated by reference herein.

BACKGROUND

1. Field

The present disclosure relates generally to apparatus and methods for spectrum sharing using Listen-Before-Talk (LBT) and quiet periods, and more specifically to spectrum sharing among heterogeneous systems using LBT and quiet periods with an accounting for time of transmission.

2. Background

The proliferation of wireless devices and applications has generated a huge demand for bandwidth that is expected to grow well into the future. Unfortunately, bandwidth is very scarce and hence an efficient utilization of this resource is crucial. The Federal Communication Commission's (FCC's) established frequency allocation shows a heavily crowded and fragmented spectrum with most frequency bands already assigned to different licensed (primary) users for specific services. However, studies conducted by the FCC and in the industry show that on the average only about 15% of the spectrum is used at any given time and location.

Accordingly, several techniques for sharing spectrum among different users, such as those that can be encompassed by the term "cognitive radio," have been developed that seek to overcome the spectral shortage problem by enabling secondary (unlicensed) wireless devices to communicate without interfering with the primary (licensed) users of a frequency bands. Cognitive radio communication faces a multitude of challenges in spectrum access, coexistence and sharing. In single secondary user environments, the spectrum access problem reduces to that of primary user sensing. Based on the sensing metric and the interference tolerable at the primary users, the secondary user decides to either transmit (when no primary user is detected) or goes to an idle state (when a primary user is detected).

With multiple secondary users in the same system, however, more complex coexistence protocols are required to ensure efficient sharing of the spectrum. Within the same wireless network, sharing among secondary users reduces to a conventional multiple access problem that can be controlled by the base station (BS). Consequently, many access protocols that have been proposed for spectrum sharing among homogeneous secondary users are derived from conventional medium access control (MAC) protocols like ALOHA and carrier sense multiple access (CSMA).

When there are multiple, non-interoperable networks sharing a spectrum, this is referred to as spectrum sharing between heterogeneous wireless networks. In the case of heterogeneous networks differing in the main system parameters (e.g., radio coverage, transmit power, data rates, channelization, or media access protocols), spectrum sharing becomes especially complex. The main challenge to opportunistic communication in such diverse environments lies in striking a balance between the conflicting goals of minimizing the interference among the secondary users and at the same time maximizing the performance that each system can achieve under some fairness conditions, such as LBT.

In order for two heterogeneous frame-based systems, such as OFDMA systems, to coexist, however, LBT is not sufficient. This is because if a secondary system is already transmitting with a full buffer, for example, then any other secondary user will be blocked because the medium will always be sensed busy. Therefore, for frame-based systems a quiet period (QP) is scheduled to give opportunity for other systems to acquire the medium. As one known example, use of LBT along with extended quiet period (EQP) protocols was proposed in an IEEE 802.16h draft for the coexistence of IEEE 802.16h with other secondary users (i.e., "Improved Coexistence Mechanisms for License-Exempt Operation," IEEE P802.16h/D2c, July 2007). In the extended quiet period (EQP) protocol, the system alternates deterministically between active and silence periods to satisfy a specific duty-cycle defined for the system. For example, if the system has a duty-cycle of 50% then the system can transmit every other frame; one frame on and one frame off.

LBT was also proposed, for example, as an independent protocol of the extended quiet period, and both the base station (BS) and the mobile station (MS) are supposed to apply it. In a later version of the IEEE 802.16h draft (i.e., Improved Coexistence Mechanisms for License-Exempt Operation, IEEE P802.16h/D3c, October 2007) the LBT protocol was changed to coexist specifically with IEEE 802.11 wireless local area networks. In particular, LBT was proposed to be performed at the BS only and the BS is equipped with an IEEE 802.11 transceiver that has the capabilities of sending and receiving IEEE 802.11 CTS/RTS signals. Because of this, the later draft states that the use of LBT and quiet period are optional. In both drafts of 802.16h discussed above, if both LBT and the extended quiet period are used simultaneously and if a frame during the active period is not transmitted because of the LBT protocol, then this idle frame will count toward satisfying the extended quiet period duty-cycle, which can lead to inefficient use of the spectrum. Furthermore, the conventional art does not specify how the LBT and quiet period algorithms should be combined or how a duty cycle target should be satisfied. Accordingly, there exists a need for improved efficiency of spectrum sharing among frame based networks using LBT and extended quiet period.

SUMMARY

According to an aspect, a method is disclosed for sharing a shared spectrum channel. The method includes assessing in at least one terminal in a network whether the shared spectrum channel is being used by at least one other network, and transmitting one or more transmission frames from the at least one device in the network using the shared spectrum channel in at least one of an uplink or a downlink when the channel is assessed as not being used by the at least one other network. Further, the method includes counting an accumulated time of transmission use of the spectrum channel based on predetermined conditions, and determining if the accumulated time exceeds a predetermined maximum time period, wherein transmission of one or more transmission frames continues if the maximum time period has not been exceeded. Finally, the method includes executing a quiet period when the maximum time period is exceeded.

According to another aspect, an apparatus for sharing a spectrum channel is disclosed. The apparatus includes means for assessing in at least one terminal in a network whether the shared spectrum channel is being used by at least one other network. Additionally, the apparatus includes means for transmitting one or more transmission frames from the at least one device in the network using the shared spectrum channel in at least one of an uplink or a downlink when the channel is assessed as not being used by the at least one other network. Further, the apparatus includes means for counting an accumulated time of transmission use of the spectrum channel based on predetermined conditions, and means for determining if the accumulated time exceeds a predetermined maximum time period, wherein transmission of one or more transmission frames continues if the maximum time period has not been exceeded. In addition, the apparatus includes means for executing a quiet period when the maximum time period is exceeded.

According to yet another aspect, an apparatus for sharing a shared spectrum channel is disclosed. The apparatus includes at least one processor operable to assess in at least one terminal in a network whether the shared spectrum channel is being used by at least one other network. The at least one processor is also operable to transmit one or more transmission frames from the at least one device in the network using the shared spectrum channel in at least one of an uplink or a downlink when the channel is assessed as not being used by the at least one other network. Still further, the at least one processor is configured to count an accumulated time of transmission use of the spectrum channel based on predetermined conditions, and determine if the accumulated time exceeds a predetermined maximum time period, wherein transmission of one or more transmission frames continues if the maximum time period has not been exceeded. Further, the at least one processor is operable execute a quiet period when the maximum time period is exceeded.

According to still one more aspect, a computer program product, comprising a computer-readable medium is disclosed. The medium may include code for causing a computer to assess in at least one terminal in a network whether a shared spectrum channel is being used by at least one other network. Further, the medium may include code for causing a computer to transmit one or more transmission frames from the at least one device in the network using the shared spectrum channel in at least one of an uplink or a downlink when the channel is assessed as not being used by the at least one other network. Additionally, the medium includes code for causing a computer to count an accumulated time of transmission use of the spectrum channel based on predetermined conditions. The medium yet further includes code for causing a computer to determine if the accumulated time exceeds a predetermined maximum time period, wherein transmission of one or more transmission frames continues if the maximum time period has not been exceeded, and code for causing a computer to execute a quiet period when the maximum time period is exceeded.

BRIEF DESCRIPTION OF THE DRAWINGS

FIGS. 3A and 3B illustrate exemplary time lines showing frame-based transmissions occurring in a shared spectrum environment, such as the environment illustrated in FIG. 1 illustrate

DETAILED DESCRIPTION

Figure 1:
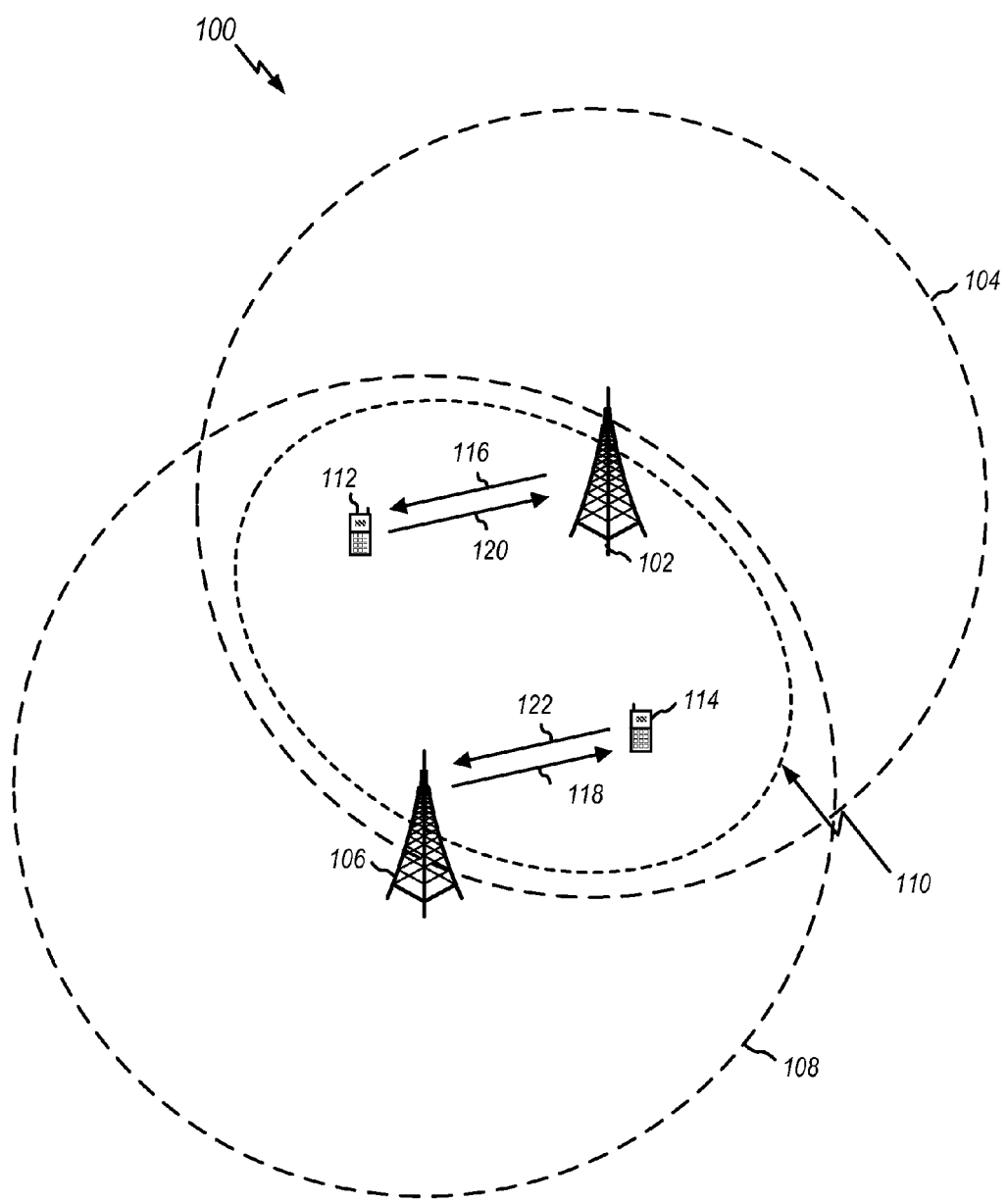
FIG. 1 illustrates an environment having two or more systems sharing a particular spectrum.

The present application discloses methods and apparatus provide spectrum sharing among heterogeneous systems using LBT and quiet periods (e.g., extended quiet period EQP) with an accounting for time of transmission on the spectrum or channel. In particular, the transmission time is accounted for, such as by using a counter to count an accumulated time of transmission use of the spectrum channel allowing the use of the spectrum, if available, up to a maximum allocated transmission time for a system. According to various disclosed aspects, either a fixed duty cycle or an adaptive duty cycle for the use of EQP may be utilized in combination with LBT.

The word "exemplary" is used herein to mean "serving as an example, instance, or illustration." Any embodiment described herein as "exemplary" is not necessarily to be construed as preferred or advantageous over other embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16 (WiMax), IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a transmission technique. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

It is noted that although terminology used herein to describe the disclosed aspects is consistent with IEEE 802.16 (WiMax), this terminology is merely exemplary and the present methods and apparatus are applicable to any of a number of various wireless technologies, such as those discussed above. For instance, the term base station (BS) may encompass other terminology for similar devices such as NodeB, Access Point (AP), Base Transceiver Station (BTS), etc. As another example, the term Customer Premise Equipment (CPE) or subscriber station (SS) may encompass devices such as User Equipment (UE), Mobile Station (MS), Access Terminal (AT), mobile device, handset, and so on.

FIG. 1 illustrates an example of an environment 100 having two or more systems sharing a particular spectrum. A base station (BS) 102 effects coverage 104 for a first system or network, such as a packet based system, although not limited to such. Similarly, a second system (e.g., another packet base system) is effected with base station (BS) 106 having a coverage area 108. For purposes of illustration, FIG. 1 shows a common environment 110 where spectrum is shared among at least the two systems implemented by BS 102 and BS 106. It is noted that the geometries and areas illustrated are merely exemplary and environment 110 connotes any environment where spectrum is capable of being shared among at least a primary system and at one secondary system.

Furthermore, FIG. 1 is illustrative of the case of heterogeneous networks with BS 102 effecting a first network differing from system parameters of the second network effected by BS 106. Additionally, the illustrated first and second networks may be either a primary and secondary network, respectively, or both secondary networks.

Each system is operable for communication to one or more subscriber stations (SS) illustrated by a first SS 112 in communication with BS 102 and a second SS 114 in communication with BS 106. Each SS 112, 1124 is respectively capable of communication with BS 102, 106 in both a downlink (DL) channel(s) 116 and 118 and uplink (UL) 120 and 122.

Figure 2:
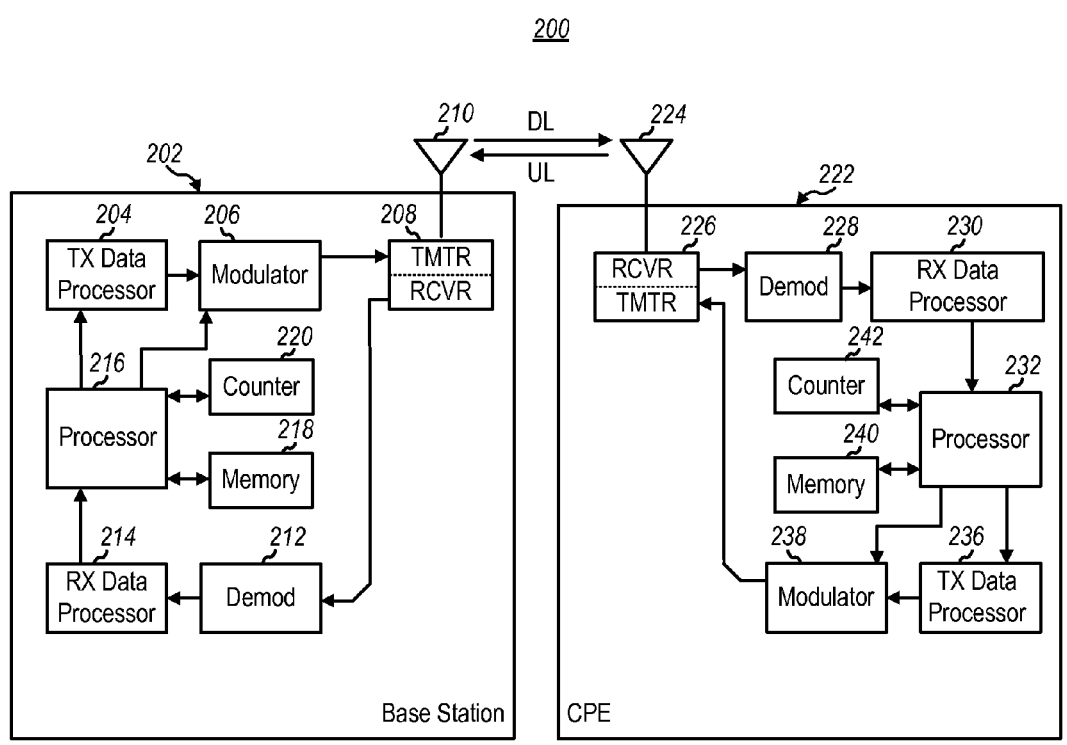
FIG. 2 is an exemplary system operable for sharing spectrum in a shared spectrum environment such as that illustrated in FIG. 1.

FIG. 2 illustrates an exemplary system 200 operable in a shared spectrum environment such as that illustrated in FIG. 1. In an aspect, system 200 includes a base station or access point 202 having a transmit (TX) data processor 204, which receives data to be transmitted from a data source (not shown). In an example, TX data processor 204 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) in a modulator 206 based on a particular modulation scheme (e.g., BPSK, QSPK, M-PSK, or M-QAM) selected for that data stream to provide modulation symbols. The data rate, coding, and modulation for each data stream may be determined by instructions performed by a processor 216, or similar device such as a Digital Signal Processor (DSP) or a general processor, as two examples.

The modulation symbols for all data streams are then provided to a transmitter/receiver 208, which may further process the modulation symbols (e.g., for OFDM). Transmitter/receiver 208 then provides modulation symbol streams wirelessly via antenna 210 to one or more CPEs or access terminals 222 via antennas 210 and 224.

Additionally, the transmitter/receiver 208 receives and processes signals received via antenna 210 from the various CPEs (e.g., 222). Transmitter/receiver 208 received signals on the UL from the various CPEs, processing the received symbol stream to provide one or more analog signals. (e.g., filters, amplifies, and downconverts) a respective received signal, digitizes the conditioned signal to provide samples, and further processes (e.g., channel estimation, demodulation, deinterleaving, etc.) and decodes the samples to provide a corresponding "received" symbol stream, such as through demodulator 212. An RX data processor 214 then receives and processes the received symbol streams based on a particular receiver processing technique to recover the traffic data for the data stream.

Processor 216 may also be communicatively coupled to a memory 218, similar medium configured to store computer-readable, or processor instructions. Furthermore, the base station may include a counter 220 or any similar device known in the art for incrementing and storing one or more count values. This count may be used, among other things, to keep a cumulative count of the time of transmission of terminals, whether DL transmission from the base station 202 or UL transmissions from CPEs in a particular system in which the terminals operate. Although shown as a separate unit 220, it is contemplated that the count functions effected thereby may be implemented by memory 218, processor 216, or any other suitable devices.

A transmitter/receiver 226 of the CPE 222 receives DL transmission signals on from a base station (e.g., 202) and processes received symbol streams or frames to provide one or more analog signals, and further conditions (e.g., amplifies, filters, upconverts, etc.) analog signals to provide a modulated signal suitable for transmission on the UL to the base station 202. Each CPE receiver 226 conditions (e.g., filters, amplifies, and downconverts) a respective received signal, digitizes the conditioned signal to provide samples, and further processes (e.g., channel estimation, demodulation, deinterleaving, etc.) and decodes the samples to provide a corresponding "received" symbol stream, such as through demodulator 228. An RX data processor 230 then receives and processes the received symbol streams based on a particular receiver processing technique to recover the traffic data for the data stream. The decoded data for each data stream may be then utilized by a processor 232, or similar device such as a Digital Signal Processor (DSP) or a general processor, as two examples.

Processor 232 may also be communicatively coupled to a memory 240 or similar medium configured to store computer-readable or processor instructions. Furthermore, the base station may include a counter 242 or any similar device known in the art for incrementing and storing one or more count values. This count is the same as the count of counter 220 in a base station (e.g., 202) and may be used to keep a cumulative count of the time of transmission of terminals, whether DL transmission from the base station 202 or UL transmissions from CPEs in a particular system in which the terminals operate. Although shown as a separate unit 242, it is contemplated that the count functions effected thereby may be implemented by memory 218, processor 216, or any other suitable devices.

CPE 222 also includes a TX Data Processor 236 and Modulator 238 for preparing encoded and modulated symbols or frames to be transmitted over the UL. The encoded and modulated symbols are input to the transmitter/receiver 226 for transmission via antenna 224 to a base station, such as base station 202. At base station 202, the modulated signals from transmitter/receiver system 226 are received by antenna 210, conditioned by transmitter/receivers 208, demodulated by a demodulator 212, and processed by a RX data processor 214 to extract the DL message transmitted by the CPE 222. Processor 216 then may processes the extracted message further for use in the base station.

FIGS. 3A and 3B illustrate exemplary time lines showing frame-based transmissions occurring in a shared spectrum environment, such as the environment illustrated in FIG. 1. The nomenclature of uplink (UL) and downlink (DL) denote transmissions to base station (e.g., 202) from a CPE or SS (e.g., 222) and from a base station to a CPE or SS, respectively. Additionally, the timelines illustrate an example for Time Division Duplex (TDD) systems wherein UL and DL transmissions are separated in time to emulate full duplex transmission in a half-duplex wireless environment. It is noted, however, that one skilled in the art will appreciate wider applicability of the presently disclosed methods and apparatus to systems other than TDD, such as Frequency Division Duplex (FDD) systems as one example.

In FIG. 3A, time line 302, illustrates activity for a particular radio technology in an environ having at least two heterogeneous frame-based systems, as one example. A sensing interval 304 is effected between each transition from one transmission to another, such as from DL to UL transmissions (e.g., 306 and 308, respectively). As will be explained further, the sensing interval allows devices to determine if other devices are transmitting in the spectrum before initiating transmission such as LBT.

At one illustrated sensing interval 310, it is assumed that a CPE senses other users of the spectrum transmitting. In this instance, the UL transmission from that device is stopped as illustrated by time interval 312, which may be equal to an UL frame time. If a base station senses other user of the spectrum in another sensing interval 314, the base station will cease transmission for a time period equal to the time of a DL and UL frame illustrated by a quiet period 316. After a quiet period such as period 316 and a sensing interval, the base station, if sensing no activity in the sensing period, will transmit a DL frame 318 and so forth.

FIG. 3B illustrates another exemplary time line 320 in accordance with the disclosed methods and apparatus where transmissions by one or more base stations and CPEs belonging to a particular technology utilize a shared spectrum up to a predetermined maximum time period for transmission, as well as an extended quiet period (EQP). For example, the time line 320 shows a succession of UL and DL transmissions 322, 324, and 326 that continue as long as no other user is sensed during the sensing intervals 304. After the time of spectrum utilization ($T_{on}$) is equal to the predetermined maximum ($T_{max}$), the wireless devices operating according to the particular radio technology will cease transmission for at least an extended quiet period (EQP) before attempting to utilize the shared spectrum once again.

The EQP such as EQP 328 illustrated in FIG. 3B may be initiated according to a specific, fixed duty cycle. In particular, a particular radio system may alternate deterministically between active and silence periods to satisfy a specific duty-cycle defined for the system. For example, if the system has a duty-cycle of 50%, then the system can transmit every other frame; one frame on and one frame off.

As mentioned above, a counter (e.g., 220) is associated with each base station, as well as each CPE (e.g., 242). The counter is used, among other things, to keep a cumulative count of the time of transmission of terminals, whether base station or CPE, in a system. Thus, if a terminal transmits, whether UL or DL, the counter is configured to increment by an amount equal to the transmission time. The following discussion presents various methods for implementing a system using LBT and EQPs that could conform with a standard, such as the IEEE 802.16h draft. This description, however, is not meant to be limited to conformity with 802.16h, and one skilled in the art will appreciate broader applicability to other frame based systems operational in a shared spectrum environment.

Additionally, it is noted that because heterogeneous networks are not interoperable, sharing of the spectrum requires approaches that do not rely on exchanging messages between the networks. Accordingly, the disclosed methodologies may be configured as rule-based techniques that utilize listen-before-talk (LBT) with a quiet period (e.g., an extended quiet period (EQP)).

Figure 4:
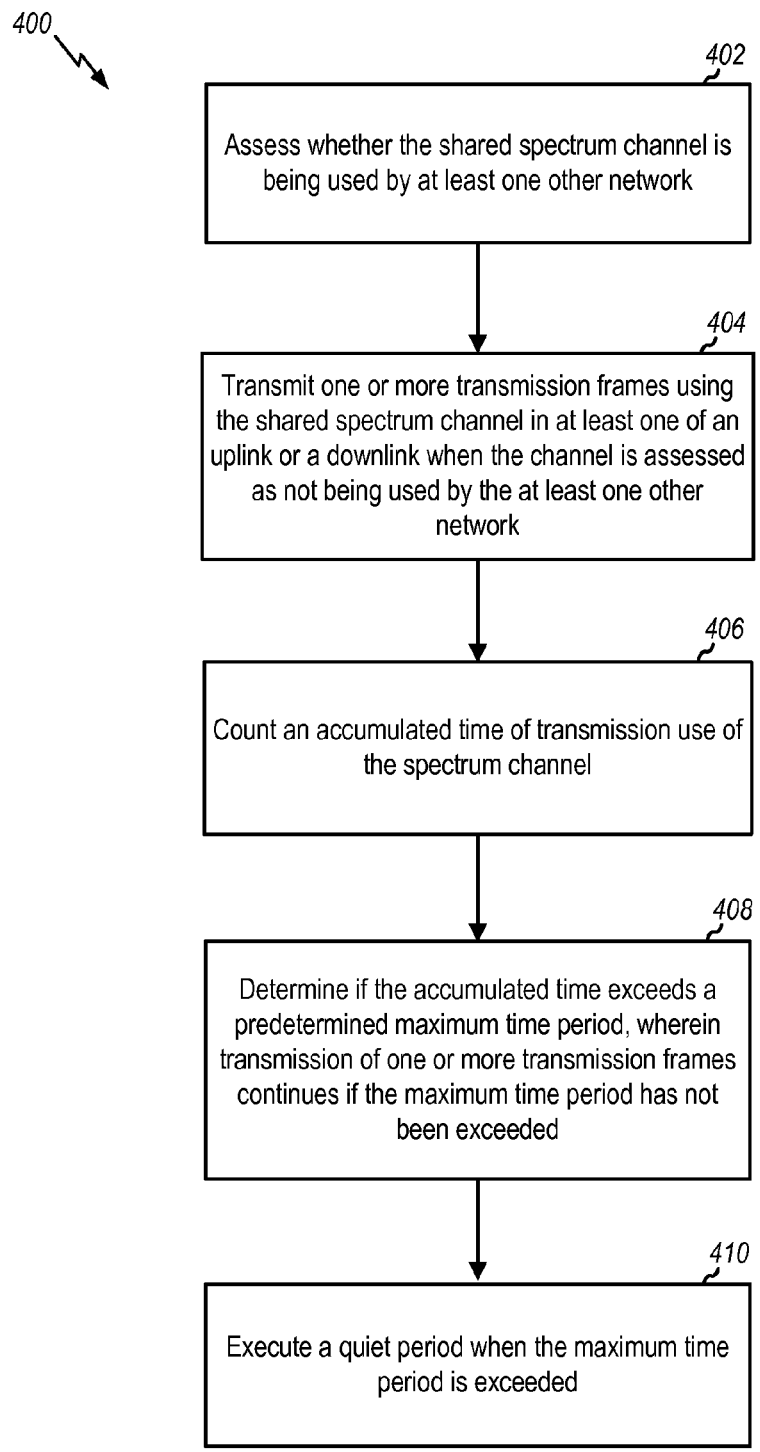
FIG. 4 illustrates a flow diagram of a method for implementing spectrum sharing in a wireless network using LBT and extended quiet periods that may be executed with either a fixed or adaptive duty cycle.

FIG. 4 illustrates a flow diagram of a method for implementing spectrum sharing in a wireless network with LBT and EQP that may be executed with either a fixed or adaptive duty cycle for the EQP in an environment with multiple, non-interoperable networks sharing a spectrum. The illustrated methods, including method 400 in FIG. 4, may be implemented within devices such as base station 202 and CPE 222 having a means for keeping a transmission time count such as counters 220 or 242.

Method 400 includes first assessing whether a shared spectrum channel or medium is being used by at least one other network as illustrated by block 402. This assessment may be implemented by including LBT in at least one device in the network, and may occur during sensing interval, such as interval 304 in FIG. 3A or 3B. After block 402, the system will then transmit one or more transmission frames using the shared spectrum channel in at least one of an uplink or a downlink when the channel or medium is assessed as not being used by the at least one other network as shown in block 404.

Method 400 also includes a process illustrated in block 406 where a count of an accumulated time of transmission use of the spectrum channel by the system is kept. It is noted here that as will be seen in the following discussed methods, the count of the elapsed or accumulated time of transmission, also designated as $T_{on}$, is maintained whether a fixed duty cycle for the EQP is desired or, alternatively, an adaptive EQP duty cycle is desired.

Finally, method 400 includes the process of block 408 where a determination is made whether the accumulated time exceeds a predetermined maximum time period. Transmission of one or more transmission frames may be allowed to continue if the maximum time period has not been exceeded and transmission is halted when the maximum time period is exceeded.

It is noted that method 400 is applicable to a variety of different systems, such those using TDD as well as FDD. When applied to FDD systems, the various processes featured in the blocks of method 400 would be implemented separately for one of the DL or UL. Furthermore, it is noted that the presently disclosed methods and apparatus are applicable to a system where a base station uses multiple channels in the DL. In such case, the methodology 400, for example, could be applied to each of the multiple channels in the DL.

It is noted that the method 400 may encompass a number of embodiments. According to an aspect of the presently disclosed methodology, two broad embodiments may include employing a fixed duty cycle for the EQP and employing an adaptive EQP duty cycle.

It is again noted that although at least some of the disclosed methods could conform with the IEEE 802.16h draft, the disclosure is not limited to conformity with 802.16h, and one skilled in the art will appreciate broader applicability to other frame based systems operational in a shared spectrum environment. Two possible techniques that conform to the general statements in the IEEE 802.16h draft include the methods of FIGS. 5 and 6 including maintaining a fixed duty cycle for the EQPs. In both these methods, a counter is used at the base station to keep track of the elapsed active time of transmission (e.g., $T_{on}$), the EQP, and the duty-cycle.

Figure 5:
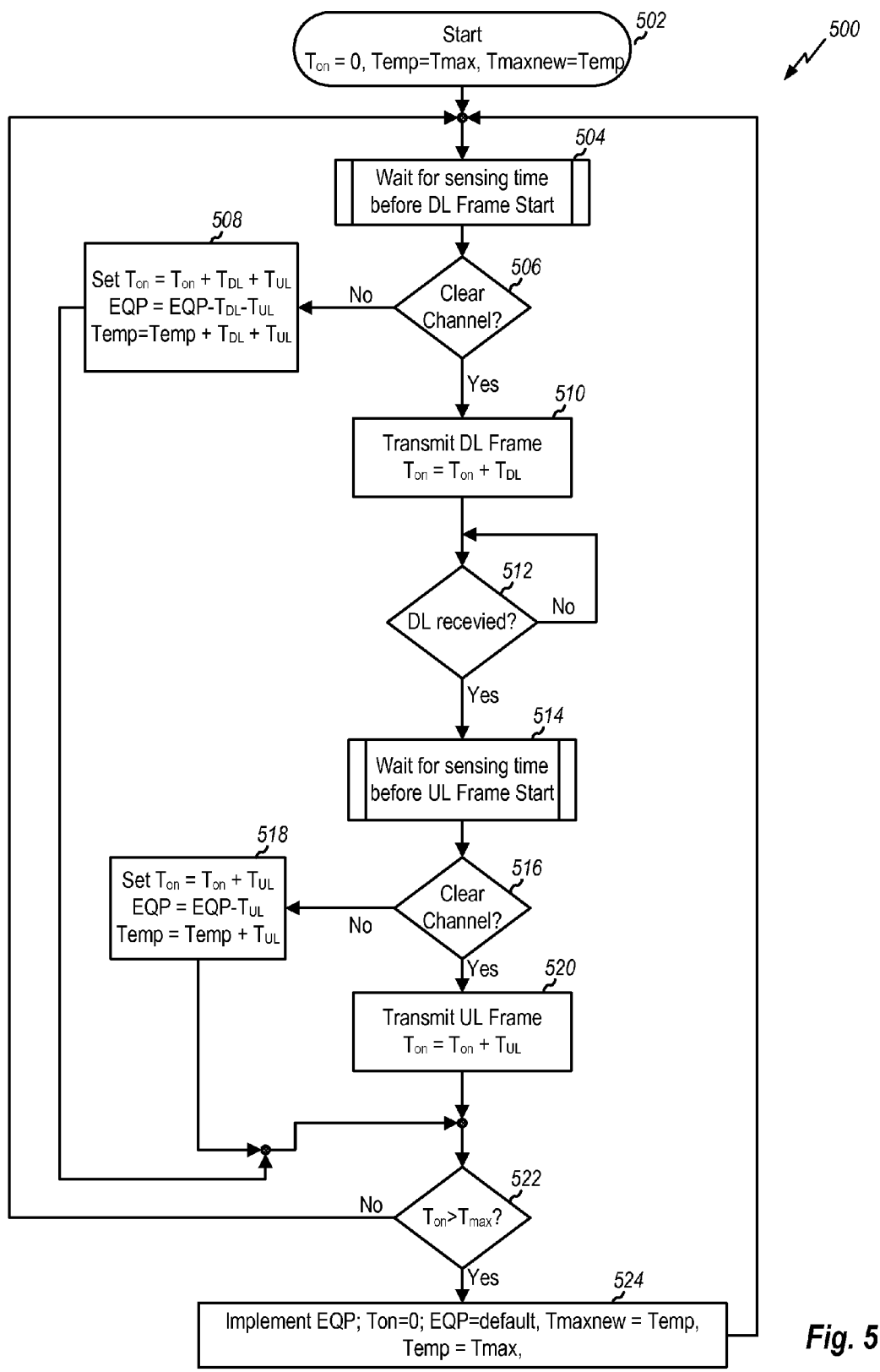
FIG. 5 is a flow diagram of an exemplary method for spectrum sharing using a fixed quiet period duty cycle.

FIG. 5 is a flow diagram of one exemplary method for spectrum sharing using a fixed quiet period duty cycle. It is noted that in the method 500 of FIG. 5, whenever the system does not transmit because the medium is sensed busy, the counter is not affected, but the next EQP is reduced and the next transmission time is increased to maintain the value of the duty cycle.

As shown in FIG. 5, method 500 starts by initializing the counter $T_{on}$ to zero and setting a temporary value (Temp) equal to a predetermined $T_{max}$, which represents a maximum time of transmission for the system. Furthermore, a value Tmaxnew is to the Temp value. Flow then proceeds to block 504 where a base station, for example, waits for a predetermined sensing period before transmitting a DL frame in order to sense traffic on the shared medium or channel. If the channel is not clear, as determined at decision block 506, flow proceeds to block 508. At 508 the time $T_{on}$ is set equal to the current $T_{on}$ value plus the time of DL and UL transmissions ($T_{DL}$ and $T_{UL}$). Additionally, another counter or storage for tracking the quiet period time (designated as EQP) is set to the previously determined EQP value less the time of DL and UL transmissions ($T_{DL}$ and $T_{UL}$). Additionally, the Temp value is set to the previous Temp value plus the time of DL and UL transmissions ($T_{DL}$ and $T_{UL}$). The process of block 508 thus ensures that a predetermined duty cycle for the EQP is maintained at a fixed value. After the processes of block 508, flow proceeds to block 522, which will be explained later.

Alternatively at block 506, if the channel is determined to be clear flow proceeds to block 510 for transmission of the DL frame by the base station. It is noted that the processes of block 506, in part, constitutes an LBT process whereby the device(s) in the network determine usage of the channel prior to transmission. In an aspect, the LBT determination in block 506 may be effected within a base station in the network. Additionally, the processes of block 506 may include Clear Channel Assessment (CCA) functionality to determine the usage of the channel and potential collisions with other networks (note: similar processes in the following described methods also may include CCA functionality).

In block 510, the DL frame is transmitted and the counter $T_{on}$ is updated by adding the time of the DL transmission to the previous value. In an aspect, method 500 may also include a decision block 512 wherein a determination or acknowledgement is made as to whether the DL transmission is yet received at another network device, such as a CPE as one example. When the DL is completed, flow then proceeds to block 514.

At block 514, the system then waits for another sensing time for UL frame transmission along with a determination in decision block 516 of whether a clear channel is detected, thus effecting another LBT process prior to UL frame transmission. In an aspect, the LBT operation of block 516 may be effected at a CPE in the network. If the channel is not clear, flow proceeds to block 518 where the value of $T_{on}$ is set to the previous value plus an UL transmission time ($T_{UL}$). Additionally, the time of the EQP is changed to a previous value less the time of the UL transmission time ($T_{UL}$), and the Temp value is incremented by addition of the UL transmission time ($T_{UL}$).

Alternatively, if the channel is determined clear in block 516, the UL frame is transmitted from a network device (e.g., a CPE) as illustrated by block 520, and the count $T_{on}$ is incremented by the UL transmission time ($T_{UL}$). Flow then proceeds to block 522 where a determination is made whether the current value of $T_{on}$ exceeds the value of $T_{max}$. If not, signifying the total allotted time for transmission by the system has not been expended, flow proceeds back to block 504. Alternatively, if the value of $T_{on}$ is greater than $T_{max}$, flow proceeds to block 524 where the current EQP time is implemented. Additionally, the value of $T_{on}$ is reset to zero, the EQP reset to a predetermined default value, the Tmaxnew value set to the Temp value and the Temp value then reset to equal the $T_{max}$ value. Afterwards, flow proceeds back to block 504 to repeat the processes of method 500 after the execution of the EQP.

As may be appreciated in method 500, if UL and DL transmission does not occur in a particular cycle, such as when no clear channel is determined at 506, the $T_{on}$ counter is nonetheless incremented and the EQP period decremented to ensure that duty cycle of the $T_{on}$ and EQP periods is maintained at a fixed value. Similarly, when partial transmission occurs (e.g., no clear channel at block 516 and thus no UL transmission), the $T_{on}$ and EQP periods are nonetheless respectively incremented and decremented by the UL transmission again ensuring the duty cycle remain at a fixed amount. In other words, whenever the system does not transmit because the medium is sensed as busy, the counter is not affected but the next quiet period is reduced and the next transmission time is increased to maintain the value of the duty cycle.

Figure 6:
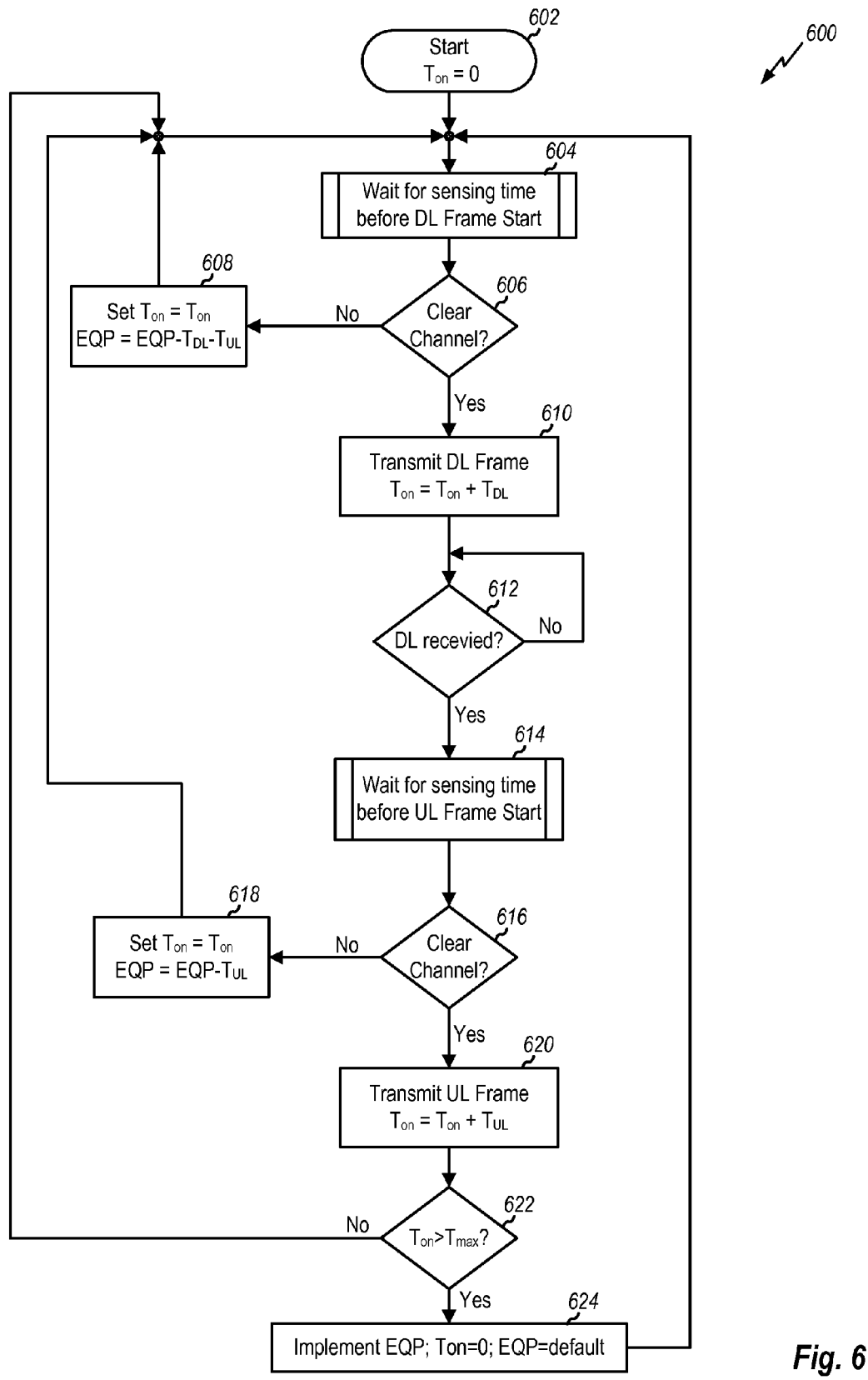
FIG. 6 is a flow diagram of another exemplary method for spectrum sharing using a fixed quiet period duty cycle.

FIG. 6 is a flow diagram of another exemplary method 600 for spectrum sharing using a fixed quiet period duty cycle. In this method, initialization includes setting the $T_{max}$ counter equal to zero as shown in block 602. Flow proceeds then to process block 604 to wait a sensing time prior to a DL frame transmission. If the channel or medium is sensed to not be clear at block 606 using LBT, flow proceeds to block 608. Here, the counter value $T_{on}$ at the base station is set to its current value $T_{on}$, or in other words, stopped or halted, while the time of the EQP is decremented by a time in which the system is idle (i.e., reduced by a transmission time of the DL ($T_{SL}$) and UL ($T_{UL}$) transmissions). This ensures that the duty cycle is maintained constant, regardless of whether the system is idle. After block 608, flow proceeds back to block 604 to repeat the process.

If the channel is clear, as determined by LBT at decision block 606, flow alternatively may proceed to block 610 for transmission of a DL frame and incrementing of the $T_{on}$ counter by the time of the DL transmission ($T_{SL}$). In an aspect, method 600 may also include a decision block 612 wherein a determination or acknowledgement is made as to whether the DL transmission is yet received at another network device, such as a CPE as one example. When the DL is completed, flow then proceeds to block 614.

At block 614, another sensing time tolls before the UL frame transmission from at least one CPE to a base station. If the channel is not clear, as determined by LBT at decision block 616, then flow proceeds to block 618 where the count $T_{on}$ is set to the current value of $T_{on}$ or, in other words, frozen. Additionally, the value of the EQP is reduced by the idle time; i.e., the time of UL frame transmission. Flow then proceeds from block 618 back to 604 for continued efforts to utilize the shared medium. It is noted that the LBT in block 616 may be performed in a CPE, as one example.

If the channel is clear as determined at block 616, flow proceeds to block 620 where the UL frame is transmitted from a device such as a CPE to another device such as a base station. Additionally, the count $T_{on}$ is incremented by the time of the UL frame transmission ($T_{UL}$). Flow then proceeds to decision block 622 where a determination is made whether the current value of $T_{on}$ is greater than a predetermined $T_{max}$ period representing a maximum allocated time for transmission during a cycle. If not, flow reverts back to block 604 for continued efforts to utilize the shared medium.

If $T_{max}$ has been exceeded, then flow proceeds to block 624 where the current EQP is implemented to complete the EQP duty cycle. Additionally $T_{on}$ is reset to zero, and the stored EQP value is reset to a predetermined default value. Flow proceeds from block 624 back to block 604 for the resumption of transmission processes including LBT for a next cycle.

Figure 7:
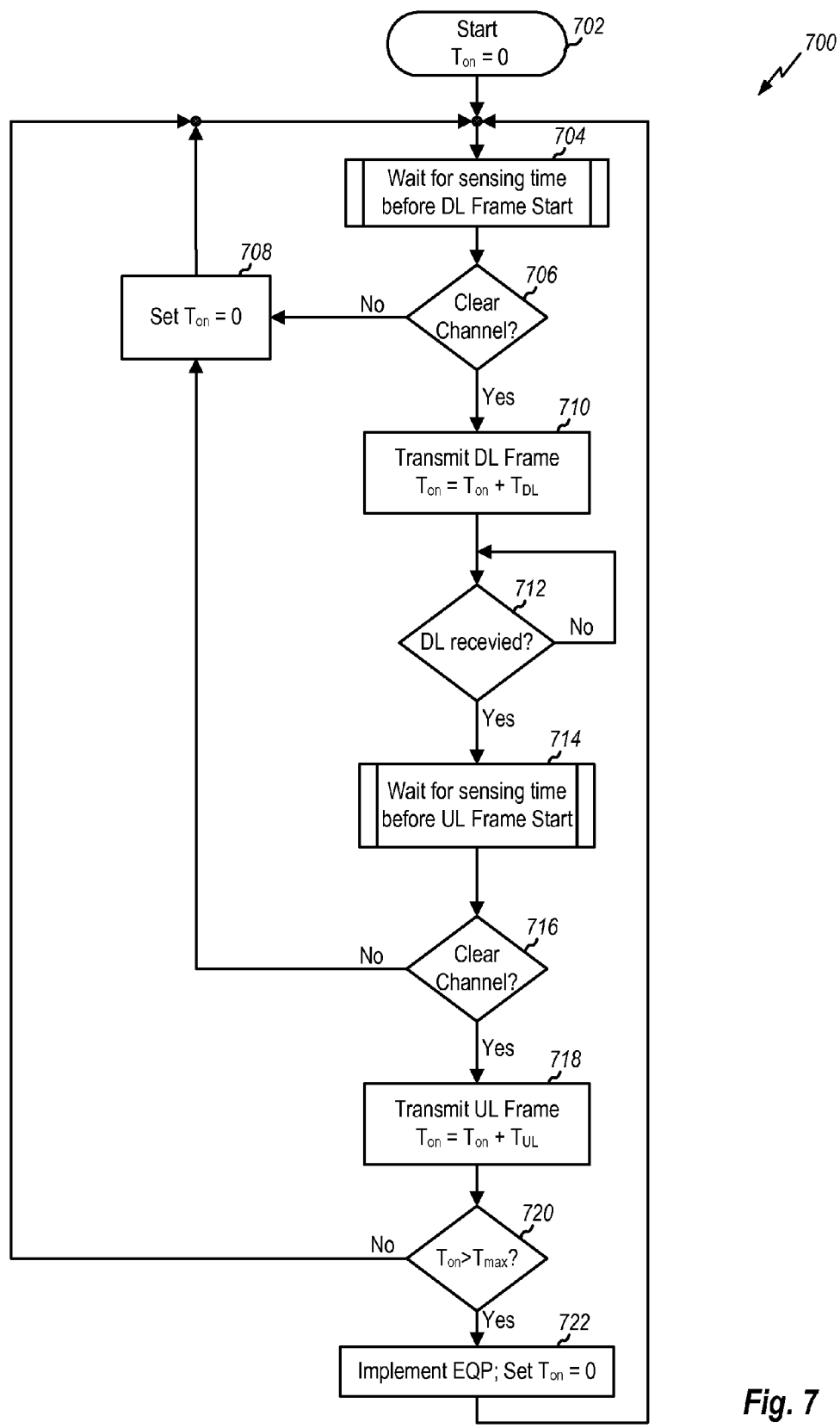
FIG. 7 is a flow diagram of an exemplary method for spectrum sharing using an adaptive duty cycle.

According to another aspect, a method 700 for spectrum sharing between two heterogeneous systems is illustrated in FIG. 7. In this method, rather than maintaining a fixed duty cycle for the EQP, the duty cycle is variable or adaptive. This proposed approach utilizes LBT and quiet periods similar to the previously discussed methods in FIGS. 5 and 6, but differs in that an adaptive quiet period duty cycle is utilized. The processes of disclosed method 700 may be implemented in one or more terminals in a particular heterogeneous system (e.g., a base station and a CPE).

As illustrated in FIG. 7, method 700 may initially set counter $T_{on}$ equal to zero as shown in block 702. Flow then proceeds to block 704 where a terminal in the system waits for a sensing period prior to the start of a DL frame transmission. After the sensing period, a determination is made using an LBT technique, as one example, whether the channel is clear as illustrated by decision block 706. The particular terminal may be configured to listen to the entire channel and not only to its assigned sub-channel. If the medium is sensed to be busy, flow proceeds to block 708 where the counter $T_{on}$ is set to zero and flow returns to block 704 for another sensing period and LBT determination.

Alternatively, if the medium is sensed to be idle, the terminal transmits a DL frame, as shown by block 710. Additionally, the counter $T_{on}$ is incremented by an amount equal to the transmission time (e.g., the DL frame transmission time ($T_{DL}$)). Furthermore, according to an aspect, method 700 may also include a decision block 712 wherein a determination or acknowledgement is made as to whether the DL transmission is yet received at another network device, such as a CPE as one example. When the DL frame transmission is completed, flow then proceeds to block 714.

At block 714, another wait period for sensing is performed at a terminal in the system, such as at a CPE. In the example of FIG. 7, the sensing time is executed prior to a UL frame transmission start. Next flow proceeds to decision block 716 to determine if the channel or medium is clear through an LBT process, as an example. If the channel is not clear, flow proceeds to block 708 to reset the counter $T_{on}$ to zero and then back to block 704. ON the other hand, if the channel is determined clear in block 716, flow proceeds to block 718 where the UL frame is transmitted, such as transmission from a CPE to a base station. The counter $T_{on}$ is also incremented by the transmission time of the UL frame ($T_{UL}$). In one aspect for the uplink of a multiuser scenario (e.g., orthogonal frequency division multiple access (OFDMA)), if all terminals in a system sense the medium to be busy and stop transmission then the counter $T_{on}$ is reset to zero as indicated by flow from block 716 to 708. However, if only a subset of users in the uplink do not transmit because of LBT (e.g., block 716), the counter would not be reset to zero (i.e., flow would proceed to block 718 as a subset of users would transmit UL frames).

After transmission of the UL frame, method 700 performs a check to determine whether $T_{on}$ is greater than a predetermined total transmission time of $T_{max}$ as illustrated by decision block 720. If the time $T_{max}$ has not yet been exceeded, flow reverts directly back to block 704. Otherwise, flow proceeds to block 722 where a predetermined EQP time period is executed for the particular system, and the counter $T_{on}$ reset to zero. After the quiet period ends, the network starts listening to the medium again as indicated by flow from block 722 back to 704. If the medium is clear, the system transmits. Otherwise, the system refrains from transmission for a period equal to DL plus UP frame times, for example. If the downlink is transmitted, and a subset of the terminals senses the medium to be busy before the uplink frame, then only this subset of terminals does not transmit in the subsequent uplink frame.

As one skilled in the art will recognize, the approach of method 700 does not put any constraints on the system to satisfy a certain duty-cycle of activity and quiet-period. By resetting the counter $T_{on}$ to zero upon detection of medium usage in blocks 706 or 716 effects an adaptive duty cycle, wherein the quiet period (EQP) is unaffected as a result. This approach can lead to less idle time where two or more heterogeneous systems in a shared spectrum environment do not utilize the medium simultaneously. In addition, the transmitting network cannot transmit continuously for more than the predetermined maximum time period $T_{max}$ for a particular cycle. In some respects, this approach may be beneficial over an approach that requires a fixed duty-cycle, such as the methods of FIGS. 5 and 6. That is, a network that targets a specific or fixed duty-cycle can capture the channel for a significantly longer time, which increases the probability that the other heterogeneous networks present in an environment can interfere with it. The method of FIG. 7, free of this constraint, may reduce the probability of interference, as the capture of the channel is more adaptive.

According to another aspect, method 700 may also include an adaptive maximum transmission time with quiet periods to further improve spectrum sharing. For example, if two systems are well separated, then it would be desirable that both systems operate most of the time with high success probability. Accordingly, method 700 may be further configured to include listening to the channel during silence times, wherein the system can be configured to infer the traffic activity of the other system and adapt its transmission time (e.g., $T_{max}$), accordingly. Yet further, in another aspect a system can be configured to track its own packet failure rate. This tracking affords an indication of the level of interference and, thus, the best channel utilization. Moreover, the threshold for the CCA test (e.g., processes 706 and 716) could be configured to be adjusted according to the level of interference.

In still another aspect, an antenna array can be utilized at a base station to null out the signal from other base stations. If space division multiple access (SDMA) is used, then this can potentially reduce the interference effects. Since the UL is more acutely affected by a hidden node problem, then the base station can be configured to transmit a busy tone during the UL. Since the transmitted tone is known at the base station, it can be compensated for and cancelled from its own receiver path. Sub-carrier allocation can be performed such that the least interfering pair of terminals is paired together. This can be done through each CPE measuring the interference seen in different bands and transmitting this information to the base station. The base station can then assign channel resources to users based on the interference seen at each one of them, which is a form of multiuser diversity.

Figure 8:
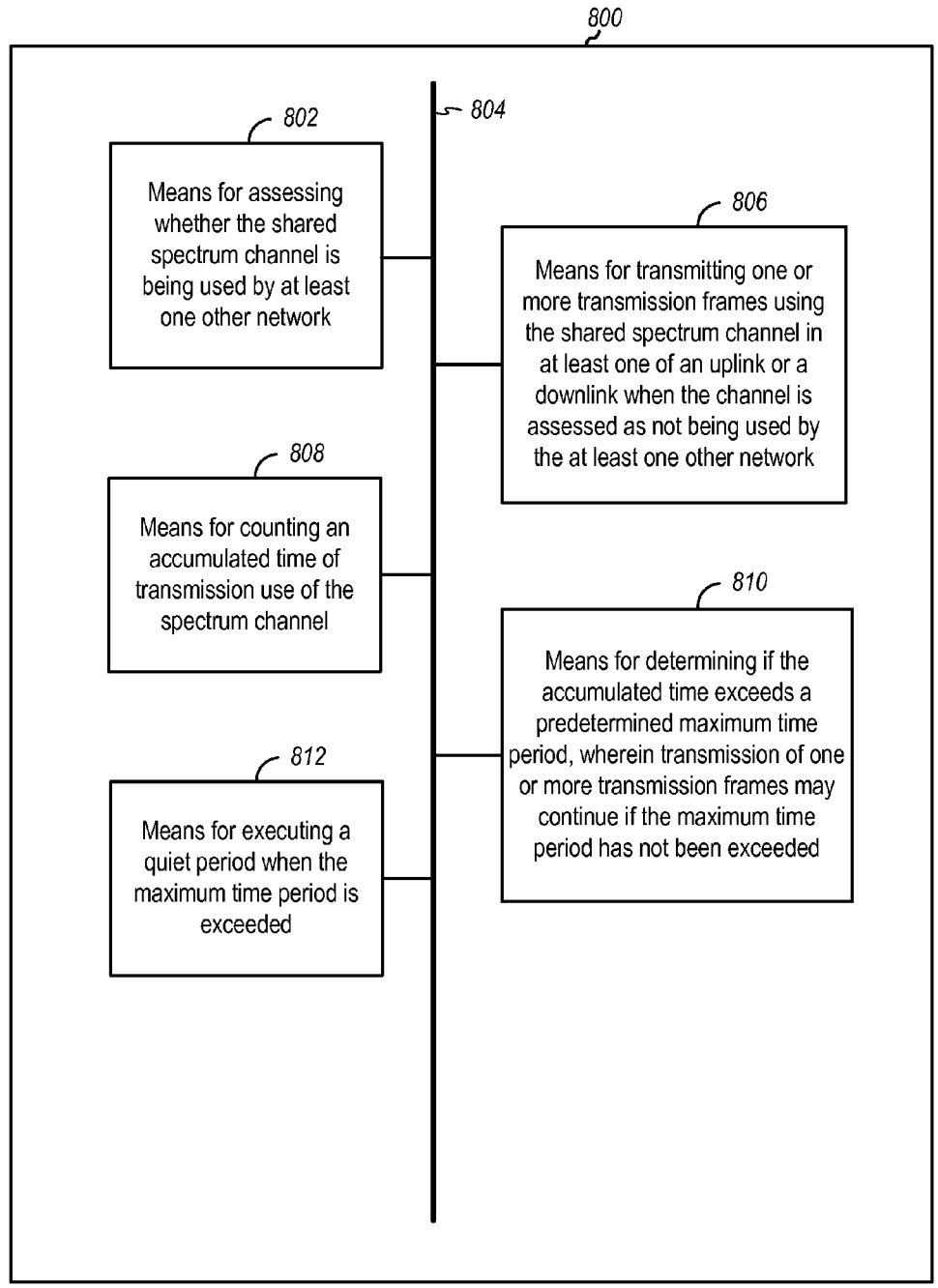
FIG. 8 illustrates another apparatus configured to implement spectrum sharing in a shared spectrum environment

FIG. 8 illustrates an apparatus configured to implement spectrum sharing in a shared spectrum environment. Apparatus 800 includes means 802 for assessing whether the shared spectrum channel is being used by at least one other network. Means 802 may be implemented, for example, by one or more of a transmitter/receiver, demodulator, data processor, and digital signal processor (DSP), such as in the apparatus illustrated in FIG. 2. Apparatus 800 is further illustrated with a communication coupling such as a bus 804 or similar means for communication between modules or means.

Apparatus 800 further includes means 806 for transmitting one or more transmission frames using a shared spectrum channel in at least one of an uplink or a downlink when the channel is assessed as not being used by the at least one other network. In an aspect, means 806 may be configured to implement LBT and CCA, and may be carried out in one or more terminals, such as base stations and CPEs in a network. Further, means 806 may be implemented by one or more of a transmitter/receiver, demodulator, data processor, and digital signal processor (DSP), such as in the apparatus illustrated in FIG. 2.

Further, apparatus includes means 808 for counting an accumulated time of transmission use of the spectrum channel. In one example, means 808 may be configured as a counter (e.g., counter 220 or 242) or similar means for maintaining one or more counts Additionally, means 808 may implement counting the time $T_{max}$ as well as the DL and UL transmission times (e.g., $T_{SL}$ and $T_{UL}$). Furthermore, means 808 may also be implemented by or in conjunction with a processor for performing processes or operations such as calculating times of transmission and the EQP values, as well as resetting the means for counting.

Apparatus 800 further includes means 810 for determining if the accumulated time exceeds a predetermined maximum time period (e.g., $T_{max}$), wherein transmission of one or more transmission frames may continue if the maximum time period has not been exceeded. Means 810 may be implemented by one or more of a processor, DSP, and a counter (e.g., 220 or 242). Finally, apparatus 800 includes means 812 for executing a quiet period when the maximum time period is exceeded. This may be implemented by one or more of a processor, DSP, transmitter/receiver, transmit processor, and counter, such as illustrated in the system of FIG. 2.

Although apparatus 800 is shown as a singular apparatus in FIG. 8, it is noted that the apparatus may encompass or be implemented across multiple apparatus in a wireless network. For example, means for counting may be implemented in both base stations and CPEs as illustrated by the system in FIG. 2.

According to another aspect, a terminal assessing whether the medium is busy or idle could be further configured to distinguish the type of interference it may encounter. For example, if the other network causing the interference does not apply the same rules of LBT and extended quiet period (EQP), then the terminal could be configured such that it does not have to yield to the other network. In addition, if the interference is coming from another terminal that belongs to the same network, then the first terminal may be configured to determine if there is a more efficient approach for sharing the spectrum with other terminals that belong to the homogenous network, rather than simply abandon transmission. That is, the sensing function could be configured to be more sophisticated than simply determining a hard threshold (medium is busy or idle), such as by classifying the type of interference and reacting according to the type of interference.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Although the presently disclosed examples have been described, in particular, with Time Division Duplex (TDD) systems where a system alternately transmits UL and DL transmissions sequentially in time, the present methods and apparatus are applicable to differing schemes. As merely one example, rather than a scheme having alternating UL and DL transmissions sequentially, the system could transmit two or more time sequential DL transmissions followed by a single UL transmission or multiple time sequential UL transmission. Additionally, as discussed before, the methods herein as more broadly applicable to other systems, such as FDD systems or systems employing multiple channels, such as multiple channels in the DL.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module or computer-readable instructions may reside in a storage or computer-readable medium, such as RAM memory, flash memory, ROM memory, EPROM memory, EEPROM memory, registers, hard disk, a removable disk, a CD-ROM, or any other form of storage medium known in the art. An exemplary storage or computer-readable medium may be coupled to a processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a system terminal The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for sharing a shared spectrum channel comprising:
    assessing in at least one terminal in a network whether the shared spectrum channel is being used by at least one other network;
    transmitting one or more transmission frames from the at least one device in the network using the shared spectrum channel in at least one of an uplink or a downlink when the channel is assessed as not being used by the at least one other network;
    updating an accumulated time of transmission use of the shared spectrum channel in response to said transmitting and in response to an assessment that the shared spectrum channel is being used by at least another network;
    determining if the accumulated time exceeds a predetermined maximum time period, wherein transmission of one or more transmission frames continues if the maximum time period has not been exceeded;
    incrementing the accumulated time of transmission by at least a transmission time for one of a downlink and uplink transmission when the channel is determined as being used and the predetermined maximum time period has not been exceeded; and
    executing a quiet period when the maximum time period is exceeded.

2. A method for sharing a shared spectrum channel comprising:
    assessing in at least one terminal in a network whether the shared spectrum channel is being used by at least one other network;
    transmitting one or more transmission frames from the at least one device in the network using the shared spectrum channel in at least one of an uplink or a downlink when the channel is assessed as not being used by the at least one other network;
    updating an accumulated time of transmission use of the shared spectrum channel in response to said transmitting and in response to an assessment that the shared spectrum channel is being used by at least another network;
    determining if the accumulated time exceeds a predetermined maximum time period, wherein transmission of one or more transmission frames continues if the maximum time period has not been exceeded;
    executing a quiet period when the maximum time period is exceeded; and
    resetting the accumulated time of transmission to a predetermined value when the channel is determined as being used and the predetermined maximum time period has not been exceeded.

3. The method as defined in claim 2, wherein the accumulated time of transmission is only reset when all terminals in the network sense the shared spectrum channel is being used.

4. The method as defined in claim 1, including incrementing the accumulated time of transmission by a time for one of an uplink transmission and a downlink transmission after frame transmissions on the uplink and downlink, respectively.

5. A method for sharing a shared spectrum channel comprising:
    assessing in at least one terminal in a network whether the shared spectrum channel is being used by at least one other network;
    transmitting one or more transmission frames from the at least one device in the network using the shared spectrum channel in at least one of an uplink or a downlink when the channel is assessed as not being used by the at least one other network;
    updating an accumulated time of transmission use of the shared spectrum channel in response to said transmitting and in response to an assessment that the shared spectrum channel is being used by at least another network;
    determining if the accumulated time exceeds a predetermined maximum time period, wherein transmission of one or more transmission frames continues if the maximum time period has not been exceeded;
    executing a quiet period when the maximum time period is exceeded; and
    maintaining a fixed duty cycle for the quiet period by decrementing a time value for the quiet period based on at least one of uplink transmission time and downlink transmission time when the channel is determined as being used.

6. The method as defined in claim 5, including halting the accumulated time of transmission when the channel is determined as being used and the predetermined maximum time period has not been exceeded.

7. The method as defined in claim 1, wherein assessing in the at least one terminal in the network whether the shared spectrum channel is being used by at least one other network includes:
    waiting for a predetermined sensing period in the at least one terminal; and
    performing a clear channel assessment in the terminal to determine if the shared spectrum channel is clear.

8. The method as defined in claim 1, wherein the network and the at least one other network are heterogeneous, frame-based wireless networks.

9. The method as defined in claim 1, wherein the network operates according to one of time division duplex or frequency division duplex.

10. A method for sharing a shared spectrum channel comprising:
    assessing in at least one terminal in a network whether the shared spectrum channel is being used by at least one other network;
    transmitting one or more transmission frames from the at least one device in the network using the shared spectrum channel in at least one of an uplink or a downlink when the channel is assessed as not being used by the at least one other network;
    updating an accumulated time of transmission use of the shared spectrum channel in response to said transmitting and in response to an assessment that the shared spectrum channel is being used by at least another network;
    determining if the accumulated time exceeds a predetermined maximum time period, wherein transmission of one or more transmission frames continues if the maximum time period has not been exceeded;
executing a quiet period when the maximum time period is exceeded;
sensing one or more characteristics of interference present on the shared spectrum channel; and
modifying at least one of the predetermined maximum time period and execution of the quiet period based on the sensed one or more characteristics of interference.

11. An apparatus for sharing a spectrum channel comprising:
means for assessing in at least one terminal in a network whether the shared spectrum channel is being used by at least one other network;
means for transmitting one or more transmission frames from the at least one device in the network using the shared spectrum channel in at least one of an uplink or a downlink when the channel is assessed as not being used by the at least one other network;
means for updating an accumulated time of transmission use of the shared spectrum channel in response to said transmitting and in response to an assessment that the shared spectrum channel is being used by at least another network;
means for determining if the accumulated time exceeds a predetermined maximum time period, wherein transmission of one or more transmission frames continues if the maximum time period has not been exceeded;
means for incrementing the accumulated time of transmission by at least a transmission time for one of a downlink and uplink transmission when the channel is determined as being used and the predetermined maximum time period has not been exceeded; and
means for executing a quiet period when the maximum time period is exceeded.

12. An apparatus for sharing a spectrum channel comprising:
means for assessing in at least one terminal in a network whether the shared spectrum channel is being used by at least one other network;
means for transmitting one or more transmission frames from the at least one device in the network using the shared spectrum channel in at least one of an uplink or a downlink when the channel is assessed as not being used by the at least one other network;
means for updating an accumulated time of transmission use of the shared spectrum channel in response to said transmitting and in response to an assessment that the shared spectrum channel is being used by at least another network;
means for determining if the accumulated time exceeds a predetermined maximum time period, wherein transmission of one or more transmission frames continues if the maximum time period has not been exceeded;
means for executing a quiet period when the maximum time period is exceeded; and
means for resetting the accumulated time of transmission to a predetermined value when the channel is determined as being used and the predetermined maximum time period has not been exceeded.

13. The apparatus as defined in claim 12, wherein the accumulated time of transmission is only reset when all terminals in the network sense the shared spectrum channel is being used.

14. The apparatus as defined in claim 11, including means for incrementing the accumulated time of transmission by a time for one of an uplink transmission and a downlink transmission after frame transmissions on the uplink and downlink, respectively.

15. An apparatus for sharing a spectrum channel comprising:
means for assessing in at least one terminal in a network whether the shared spectrum channel is being used by at least one other network;
means for transmitting one or more transmission frames from the at least one device in the network using the shared spectrum channel in at least one of an uplink or a downlink when the channel is assessed as not being used by the at least one other network;
means for updating an accumulated time of transmission use of the shared spectrum channel in response to said transmitting and in response to an assessment that the shared spectrum channel is being used by at least another network;
means for determining if the accumulated time exceeds a predetermined maximum time period, wherein transmission of one or more transmission frames continues if the maximum time period has not been exceeded;
means for executing a quiet period when the maximum time period is exceeded; and
means for maintaining a fixed duty cycle for the quiet period that is configured to decrement a time value for the quiet period based on at least one of uplink transmission time and downlink transmission time when the channel is determined as being used.

16. The apparatus as defined in claim 15, including means for halting the accumulated time of transmission when the channel is determined as being used and the predetermined maximum time period has not been exceeded.

17. The apparatus as defined in claim 11, wherein the means for assessing in the at least one terminal in the network whether the shared spectrum channel is being used by at least one other network is configured to:
wait for a predetermined sensing period; and
perform a channel assessment to determine if at least one channel of the shared spectrum is clear.

18. The apparatus as defined in claim 11, wherein the network and the at least one other network are heterogeneous, frame-based wireless networks.

19. The apparatus as defined in claim 11, wherein the network operates according to one of time division duplex or frequency division duplex.

20. An apparatus for sharing a spectrum channel comprising:
means for assessing in at least one terminal in a network whether the shared spectrum channel is being used by at least one other network;
means for transmitting one or more transmission frames from the at least one device in the network using the shared spectrum channel in at least one of an uplink or a downlink when the channel is assessed as not being used by the at least one other network;
means for updating an accumulated time of transmission use of the shared spectrum channel in response to said transmitting and in response to an assessment that the shared spectrum channel is being used by at least another network;
means for determining if the accumulated time exceeds a predetermined maximum time period, wherein transmission of one or more transmission frames continues if the maximum time period has not been exceeded;
means for executing a quiet period when the maximum time period is exceeded;

means for sensing one or more characteristics of interference present on the shared spectrum channel; and means for modifying at least one of the predetermined maximum time period and execution of the quiet period based on the sensed one or more characteristics of interference.

21. An apparatus for sharing a shared spectrum channel comprising:
at least one processor configured to:
assess in at least one terminal in a network whether the shared spectrum channel is being used by at least one other network;
transmit one or more transmission frames from the at least one device in the network using the shared spectrum channel in at least one of an uplink or a downlink when the channel is assessed as not being used by the at least one other network;
update an accumulated time of transmission use of the shared spectrum channel in response to said transmitting and in response to an assessment that the shared spectrum channel is being used by at least another network;
determine if the accumulated time exceeds a predetermined maximum time period, wherein transmission of one or more transmission frames continues if the maximum time period has not been exceeded;
increment the accumulated time of transmission by at least a transmission time for one of a downlink and uplink transmission when the channel is determined as being used and the predetermined maximum time period has not been exceeded; and
execute a quiet period when the maximum time period is exceeded.

22. An apparatus for sharing a shared spectrum channel comprising:
at least one processor configured to:
assess in at least one terminal in a network whether the shared spectrum channel is being used by at least one other network;
transmit one or more transmission frames from the at least one device in the network using the shared spectrum channel in at least one of an uplink or a downlink when the channel is assessed as not being used by the at least one other network;
update an accumulated time of transmission use of the shared spectrum channel in response to said transmitting and in response to an assessment that the shared spectrum channel is being used by at least another network;
determine if the accumulated time exceeds a predetermined maximum time period, wherein transmission of one or more transmission frames continues if the maximum time period has not been exceeded;
execute a quiet period when the maximum time period is exceeded; and
reset the accumulated time of transmission to a predetermined value when the channel is determined as being used and the predetermined maximum time period has not been exceeded.

23. The apparatus as defined in claim 22, wherein the accumulated time of transmission is only reset when all terminals in the network sense the shared spectrum channel is being used.

24. The apparatus as defined in claim 21, wherein the at least one processor is configured to increment the accumulated time of transmission by a time for one of an uplink transmission and a downlink transmission after frame transmissions on the uplink and downlink, respectively.

25. An apparatus for sharing a shared spectrum channel comprising:
at least one processor configured to:
assess in at least one terminal in a network whether the shared spectrum channel is being used by at least one other network;
transmit one or more transmission frames from the at least one device in the network using the shared spectrum channel in at least one of an uplink or a downlink when the channel is assessed as not being used by the at least one other network;
update an accumulated time of transmission use of the shared spectrum channel in response to said transmitting and in response to an assessment that the shared spectrum channel is being used by at least another network;
determine if the accumulated time exceeds a predetermined maximum time period, wherein transmission of one or more transmission frames continues if the maximum time period has not been exceeded;
execute a quiet period when the maximum time period is exceeded; and
maintain a fixed duty cycle for the quiet period by decrementing a time value for the quiet period based on at least one of uplink transmission time and downlink transmission time when the channel is determined as being used.

26. The apparatus as defined in claim 25, wherein the at least one processor is configured to halt the accumulated time of transmission when the channel is determined as being used and the predetermined maximum time period has not been exceeded.

27. The apparatus as defined in claim 21, wherein the at least one processor is further configured to assess in the at least one terminal in the network whether the shared spectrum channel is being used by at least one other network including:
waiting for a predetermined sensing period in the at least one terminal; and
performing a clear channel assessment in the terminal to determine if the shared spectrum channel is clear.

28. The apparatus as defined in claim 21, wherein the network and the at least one other network are heterogeneous, frame-based wireless networks.

29. The apparatus as defined in claim 21, wherein the network operates according to one of time division duplex or frequency division duplex.

30. An apparatus for sharing a shared spectrum channel comprising:
at least one processor configured to:
assess in at least one terminal in a network whether the shared spectrum channel is being used by at least one other network;
transmit one or more transmission frames from the at least one device in the network using the shared spectrum channel in at least one of an uplink or a downlink when the channel is assessed as not being used by the at least one other network;
update an accumulated time of transmission use of the shared spectrum channel in response to said transmitting and in response to an assessment that the shared spectrum channel is being used by at least another network;
determine if the accumulated time exceeds a predetermined maximum time period, wherein transmission of one or more transmission frames continues if the maximum time period has not been exceeded;

execute a quiet period when the maximum time period is exceeded;

sense one or more characteristics of interference present on the shared spectrum channel; and modify at least one of the predetermined maximum time period and execution of the quiet period based on the sensed one or more characteristics of interference.

31. A computer program product, comprising:

a non-transitory computer-readable medium having stored thereon:

code for causing a computer to assess in at least one terminal in a network whether a shared spectrum channel is being used by at least one other network;

code for causing a computer to transmit one or more transmission frames from the at least one device in the network using the shared spectrum channel in at least one of an uplink or a downlink when the channel is assessed as not being used by the at least one other network;

code for causing a computer to update an accumulated time of transmission use of the shared spectrum channel in response to said transmitting and in response to an assessment that the shared spectrum channel is being used by at least another network;

code for causing a computer to determine if the accumulated time exceeds a predetermined maximum time period, wherein transmission of one or more transmission frames continues if the maximum time period has not been exceeded;

code for causing a computer to increment the accumulated time of transmission by at least a transmission time for one of a downlink and uplink transmission when the channel is determined as being used and the predetermined maximum time period has not been exceeded; and code for causing a computer to execute a quiet period when the maximum time period is exceeded.

32. A computer program product, comprising:

a non-transitory computer-readable medium having stored thereon:

code for causing a computer to assess in at least one terminal in a network whether a shared spectrum channel is being used by at least one other network;

code for causing a computer to transmit one or more transmission frames from the at least one device in the network using the shared spectrum channel in at least one of an uplink or a downlink when the channel is assessed as not being used by the at least one other network;

code for causing a computer to update an accumulated time of transmission use of the shared spectrum channel in response to said transmitting and in response to an assessment that the shared spectrum channel is being used by at least another network;

code for causing a computer to determine if the accumulated time exceeds a predetermined maximum time period, wherein transmission of one or more transmission frames continues if the maximum time period has not been exceeded;

code for causing a computer to execute a quiet period when the maximum time period is exceeded; and code for causing a computer to reset the accumulated time of transmission to a predetermined value when the channel is determined as being used and the predetermined maximum time period has not been exceeded.

33. The computer program product as defined in claim 32, wherein the accumulated time of transmission is only reset when all terminals in the network sense the shared spectrum channel is being used.

34. The computer program product as defined in claim 31, wherein the non-transitory computer-readable medium has stored thereon code for causing a computer to increment the accumulated time of transmission by a time for one of an uplink transmission and a downlink transmission after frame transmissions on the uplink and downlink, respectively.

35. A computer program product, comprising:

a non-transitory computer-readable medium having stored thereon:

code for causing a computer to assess in at least one terminal in a network whether a shared spectrum channel is being used by at least one other network;

code for causing a computer to transmit one or more transmission frames from the at least one device in the network using the shared spectrum channel in at least one of an uplink or a downlink when the channel is assessed as not being used by the at least one other network;

code for causing a computer to update an accumulated time of transmission use of the shared spectrum channel in response to said transmitting and in response to an assessment that the shared spectrum channel is being used by at least another network;

code for causing a computer to determine if the accumulated time exceeds a predetermined maximum time period, wherein transmission of one or more transmission frames continues if the maximum time period has not been exceeded;

code for causing a computer to execute a quiet period when the maximum time period is exceeded; and code for causing a computer to maintain a fixed duty cycle for the quiet period by decrementing a time value for the quiet period based on at least one of uplink transmission time and downlink transmission time when the channel is determined as being used.

36. The computer program product as defined in claim 35, wherein the non-transitory computer-readable medium has stored thereon code for causing a computer to halt the accumulated time of transmission when the channel is determined as being used and the predetermined maximum time period has not been exceeded.

37. The computer program product as defined in claim 31 wherein the code for causing a computer to assess in the at least one terminal in the network whether the shared spectrum channel is being used by at least one other network includes:

code for causing a computer to wait for a predetermined sensing period in the at least one terminal; and code for causing a computer to perform a clear channel assessment in the terminal to determine if the shared spectrum channel is clear.

38. The computer program product as defined in claim 31, wherein the network and the at least one other network are heterogeneous, frame-based wireless networks.

39. The computer program product as defined in claim 31, wherein the network operates according to one of time division duplex or frequency division duplex.

40. A computer program product, comprising:

a non-transitory computer-readable medium having stored thereon:

code for causing a computer to assess in at least one terminal in a network whether a shared spectrum channel is being used by at least one other network;

code for causing a computer to transmit one or more transmission frames from the at least one device in the network using the shared spectrum channel in at least one of an uplink or a downlink when the channel is assessed as not being used by the at least one other network;

code for causing a computer to update an accumulated time of transmission use of the shared spectrum channel in response to said transmitting and in response to an assessment that the shared spectrum channel is being used by at least another network;

code for causing a computer to determine if the accumulated time exceeds a predetermined maximum time period, wherein transmission of one or more transmission frames continues if the maximum time period has not been exceeded;

code for causing a computer to execute a quiet period when the maximum time period is exceeded;

code for causing a computer to sense one or more characteristics of interference present on the shared spectrum channel; and code for causing a computer to modify at least one of the predetermined maximum time period and execution of the quiet period based on the sensed one or more characteristics of interference.

* * * * *